United States Patent [19]
Watanabe

[11] Patent Number: 5,184,526
[45] Date of Patent: Feb. 9, 1993

[54] AUTOMATIC SPEED CHANGING SYSTEM FOR TWO-SHAFT TYPE GAS TURBINE ENGINE

[75] Inventor: Atsushi Watanabe, Sunto, Japan

[73] Assignee: Toyota Jidosha Kabushiki Kaisha, Toyota, Japan

[21] Appl. No.: 710,697

[22] Filed: Jun. 5, 1991

[30] Foreign Application Priority Data

Jun. 7, 1990 [JP] Japan .................................. 2-147301

[51] Int. Cl.⁵ .............................................. F16H 59/00
[52] U.S. Cl. ......................................... 74/861; 74/873
[58] Field of Search .......................... 74/861, 873, 874

[56] References Cited

U.S. PATENT DOCUMENTS

| | | | |
|---|---|---|---|
| 3,574,289 | 4/1971 | Scheiter | 74/867 X |
| 4,082,011 | 4/1978 | McQuinn et al. | 74/862 |
| 4,109,772 | 8/1978 | Poore | 74/861 X |
| 4,111,073 | 9/1978 | Chana | 74/861 X |
| 4,122,732 | 10/1978 | Chana | 74/861 X |

FOREIGN PATENT DOCUMENTS 63-97834 4/1988 Japan .
63-248932 10/1988 Japan .
63-266132 11/1988 Japan .
1-290927 11/1989 Japan .
2-37118 2/1990 Japan .

OTHER PUBLICATIONS

Preliminary Issuance of a Study Meeting Held by the Scientific Body 881 pp. 229–232, Society of Automotive Engineers of Japan, Inc.

Primary Examiner—Dirk Wright
Attorney, Agent, or Firm—Kenyon & Kenyon

[57] ABSTRACT

An automatic speed change system for a two-shaft type gas turbine engine, employed in an automotive vehicle as a prime mover thereof, is capable of varying a speed change ratio depending upon the engine driving condition. The automatic speed change system adjusts a revolution speed of a power turbine of the gas turbine engine to maintain a high efficiency at an engine idling condition while maintaining a low fuel consumption at an acceptably low level to obtain enhanced standstill acceleration characteristics without a worsening of the fuel consumption.

2 Claims, 9 Drawing Sheets

V: VEHICLE SPEED

AUTOMATIC SPEED CHANGING SYSTEM FOR TWO-SHAFT TYPE GAS TURBINE ENGINE

BACKGROUND OF THE INVENTION

1) Field of the Invention

The present invention relates generally to an automatic speed changing system for a vehicle employing a two-shaft type gas turbine engine. More specifically, the invention relates to an automatic speed changing system of a two-shaft type gas turbine engine, in which an automatic speed change mechanism capable of varying a reduction ratio in accordance with an engine driving condition is added to an automatic power transmission disposed in a power train between the output shaft of the engine and wheels.

2) Description of the Related Art

Due to the low vibration, wide variation of fuels that can be used, the large torque obtained in a low engine speed range, and other advantages, studies of the practical use of two-shaft type gas turbine engines have been made as an important factor in automotive technologies. FIG. 1 shows the construction of a typical two-shaft type gas turbine engine employed in an automotive vehicle having an automatic power transmission.

In such a two-shaft type gas turbine engine, the engine is started by a starter motor SM with a built-in clutch for driving a front gear F/G, and intake air is compressed by a compressor C, heated by a heat exchanger HE, and combusted in a combustion chamber CC by mixing with a fuel supplied from an actuator A1. The combustion gas thus-generated drives a compressor turbine CT arranged coaxially with the compressor C. The compressor turbine CT and the compressor C as combined will be referred to hereafter as "gas generator GG". The compression at the compressor C is varied depending upon the revolution speed of the compressor turbine CT. The thus-used combustion gas for driving the compressor turbine CT is transferred through a variable nozzle VN having a combustion gas path area which is adjusted by an actuator A2, for driving a power turbine PT. Then, the combustion gas passes through the heat exchanger HE and is exhausted to the atmosphere as an exhaust gas.

The actuators A1 and A2 are controlled by a control circuit CONT in accordance with a driving condition of the engine, and accordingly, a depression magnitude of an accelerator pedal and engine driving parameters are input from sensors (not shown) to the control circuit CONT. In FIG. 1, encircled figures indicate the intake air pressure P and temperature T, and represent the intake air and temperature at the corresponding position.

In the two-shaft type gas turbine engine having the construction set forth above, the revolution speed N2 of the power turbine PT is reduced by the reduction gear to a rotation speed N3, and the reduced rotation speed N3 is then transferred to an automatic power transmission A/T coupled with a torque converter including a lock-up clutch L/C. The automatic power transmission A/T converts the rotation speed to a transmission speed ratio corresponding to the shift position thereof, and transfers the rotation to the wheel W via a differential gear unit D.

The vehicle employing the two-shaft type gas turbine engine encounters a problem of obtaining a good acceleration immediately after starting from a standstill. This problem will be discussed with reference to FIG. 2.

FIG. 2 shows a comparison of an accelerating ability from standstill of a vehicle employing the gas turbine engine and that of a vehicle employing a reciprocating gasoline engine. It should be noted that the rated output of the gasoline engine is the same as that of the two-shaft type gas turbine engine. As can be seen from the figure, during the initial 0 to 2 seconds from of the start of an acceleration from a standstill of the vehicle, the two-shaft type gas turbine engine vehicle has lower response characteristics than that of the reciprocating gasoline engine vehicle, but after 2 seconds, the acceleration characteristic of the two-shaft type gas turbine engine vehicle becomes equivalent to that of the reciprocating gasoline engine vehicle. Therefore, it can be appreciated that the two-shaft type gas turbine engine vehicle has a particularly low acceleration response characteristic at the initial stage of an acceleration.

The reason for the low response characteristic will be discussed herebelow. FIGS. 3A to 3C illustrate acceleration characteristics from a standstill of the two-shaft type gas turbine engine vehicle. At a time $t<0$, the two-shaft type gas turbine engine is in an idling condition and the vehicle is at a standstill. It is assumed that the accelerator pedal is fully depressed at a timing $t>0$, and thereafter, from a timing $t=0$ the fuel flow rate Gf is controlled so that the inlet temperature of the gas generator GG becomes a target value, e.g., 1100° C. At the same time the variable nozzle VN is controlled to obtain an optimum acceleration both at the gas generator GG and of the vehicle. During a period $0<t<t1$, in which the engine is accelerated to the rated rotation speed, the gas generator GG must be accelerated, and accordingly, the compressor turbine CT must be driven at a higher speed than the rotation speed in a normal driving condition, at a magnitude sufficient to accelerate the gas generator GG, and therefore, it becomes necessary to correspondingly lower the output power of the power turbine PT. When the path area of the variable nozzle is reduced to obtain a better vehicular acceleration while the gas generator GG is in the accelerating state, the output of the compressor turbine CT is lowered, and thus the acceleration at the gas generator GG is to further delay the timing t1, and therefore, the vehicular acceleration characteristics are worsened. Namely, there is an optimal range in the control of the variable nozzle which at the same time achieves a vehicular acceleration of a certain magnitude. The resultant acceleration characteristics derived from the optimal control for the variable nozzle VN are illustrated in FIG. 2. Therefore, it has been an established theory that the two-shaft type gas turbine engine vehicle has low acceleration response characteristics at the initial stage of an acceleration from a standstill.

SUMMARY OF THE INVENTION

Therefore, an object of the present invention is to provide enhanced acceleration characteristics, particularly in an acceleration from a standstill, for a two-shaft type gas turbine engine vehicle, by varying a reduction ratio in a speed changing transmission mechanism in a power train so that a two-shaft type gas turbine engine can provide a better acceleration from a standstill of a two-shaft type gas turbine engine vehicle without an adverse affect on the fuel consumption thereof.

According to the embodiment of the present invention, a two-shaft type gas turbine engine includes a gas generator GG constituted by a compressor C and a compressor turbine provided coaxially with the compressor, a combustion chamber CC, a variable nozzle VN, a power turbine PT rotatable about a turbine shaft which is independent of the rotary shaft of the compressor and the compressor turbine. The two-shaft type gas turbine engine is provided with an automatic speed changing mechanism capable of varying a reduction ratio in accordance with an engine driving condition, between an output shaft of the power turbine PT and the input shaft of an automatic power transmission A/T.

According to the present invention, the addition of the automatic speed changing mechanism enables the revolution speed N2 of the power turbine PT or the revolution speed N1 of the gas generator GG, as well as the revolution speed N2 of the power turbine PT, to be maintained at a sufficiently high speed without changing the rotation speed N3 at the input shaft of the automatic power transmission A/T while the engine is in an idling condition and without increasing the fuel flow rate Gf. As a result, the acceleration characteristics upon an acceleration from a standstill can be significantly enhanced.

BRIEF DESCRIPTION OF THE DRAWINGS

The present invention will be understood more clearly from the description as set forth below with reference to the accompanying drawings, wherein.

DESCRIPTION OF THE PREFERRED EMBODIMENT

Figure 4:
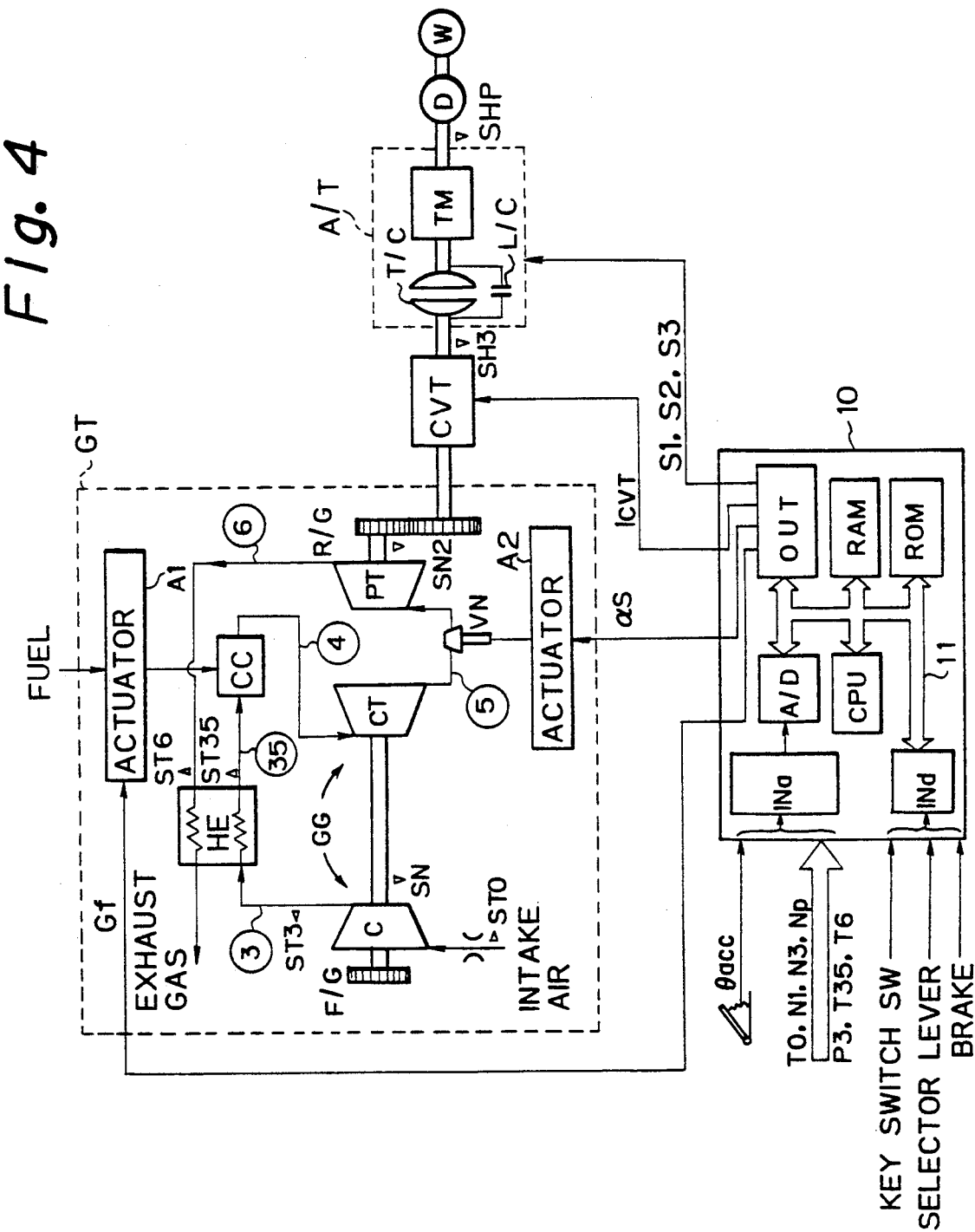
FIG. 4 is a diagrammatic illustration of one embodiment of a two-shaft type gas turbine engine with a continuously variable transmission according to the present invention.

FIG. 4 illustrates one embodiment of a two-shaft type gas turbine engine, according to the present invention. Note, components in FIG. 4 to those in FIG. 1 will be represented by the same reference numerals.

In FIG. 4, GT generally represents a gas turbine engine serving as a prime mover for an automotive vehicle. The gas turbine engine GT comprises a front gear F/G, to which a fuel pump, an oil pump, a starter motor and so forth are connected, a compressor C, a heat exchanger HE, a combustion chamber CC, a compressor turbine CT directly connected to a rotary shaft of the compressor C, a variable nozzle VN, a power turbine PT, a reduction gear R/G and so forth. As set forth above, the compressor C and the compressor turbine CT form a gas generator GG in combination.

An intake air is compressed by a compressor C, the compressed air is then heated by the heat exchanger HE, the heated air is mixed with a fuel in the combustion chamber for combustion to generate a combustion gas, and the combustion gas drives the compressor turbine CT. The combustion gas used for driving the compressor turbine CT is then fed to the power turbine PT via the variable nozzle VN, for driving the latter, and subsequently, the combustion gas passes through the heat exchanger HE for heating the compressed intake air and is exhausted as an exhaust gas to the atmosphere.

In FIG. 4, A1 denotes an actuator for supplying fuel to the combustion chamber CC and A2 denotes an actuator for adjusting the degree of opening $\alpha s$ of the variable nozzle.

In this embodiment, the reduction gear R/G of the gas turbine engine GT is connected to the automatic power transmission A/T via a continuously variable transmission CVT, which acts as an automatic speed changing mechanism. The revolution speed of the power turbine PT of the gas turbine engine GT is reduced by the reduction gear R/G and the continuously variable transmission CVT, and transferred to an automatic power transmission A/T. The automatic power transmission A/T employed in this embodiment is associated with a torque converter T/C having a lock-up clutch L/C. The automatic power transmission A/T changes the input rotation speed to a rotation speed different from the input speed at a ratio determined in accordance with the shift position thereof. The output of the automatic power transmission A/T is transferred to a wheel W via a propeller shaft PS and a differential gear unit D, for driving the vehicle.

The operations of the gas turbine engine GT and the automatic power transmission A/T are controlled by a input interface INa for analog form input signals, a digital input interface INd for digital form input signals, an analog-to-digital converter (A/D) which performs an analog-to-digital conversion to obtain digital signals from the analog signals input through the analog input interface INa, a central processing unit (CPU), a random-access memory (RAM), a read-only memory ROM and an output circuit OUT and so forth. The components set forth above are connected to the associated components via bus lines 11.

For the two-shaft type gas turbine engine GT, a temperature sensor ST0 for monitoring the atmospheric temperature, a rotation speed sensor SN1 for monitoring a rotation speed of the gas generator GG, a temperature sensor ST3 and a pressure sensor SP3 respectively for monitoring a temperature T3 and pressure P3 at the outlet of the compressor C, a temperature sensor ST35 for monitoring a temperature T35 at the outlet of the heat exchanger HE, a temperature sensor ST6 for monitoring a temperature T6 at the outlet of the power turbine PT, a rotation speed sensor SN3 for monitoring a rotation speed N3 at the output shaft of the engine, i.e., a rotation speed N3 at the input shaft of the automatic power transmission A/T, a rotation sensor SNp for monitoring a rotation speed Np of the propeller shaft, and so forth, are provided.

Signals N1, N3, Np, P3, T35 from the foregoing relevant sensors and depression magnitude signal θacc from the accelerator pedal are input to the analog input interface INa. On the other hand, an ON/OFF signal from an ignition switch, a shift position signal from a selector lever, a brake signal from a brake and so forth are input to the digital input interface INd.

Further, a fuel control signal Gf for the actuator A1 for controlling fuel flow rate, and a variable nozzle control signal αs for controlling a degree of opening of the variable nozzle VN, a lock-up control signal C3 for commanding engagement and disengagement of the lock-up clutch L/C of the torque converter T/C, shift control signals S1 and S2 for a power transmission gear assembly TM, a throttle wire signal θth and so forth are output from the output circuit OUT.

Figure 5:
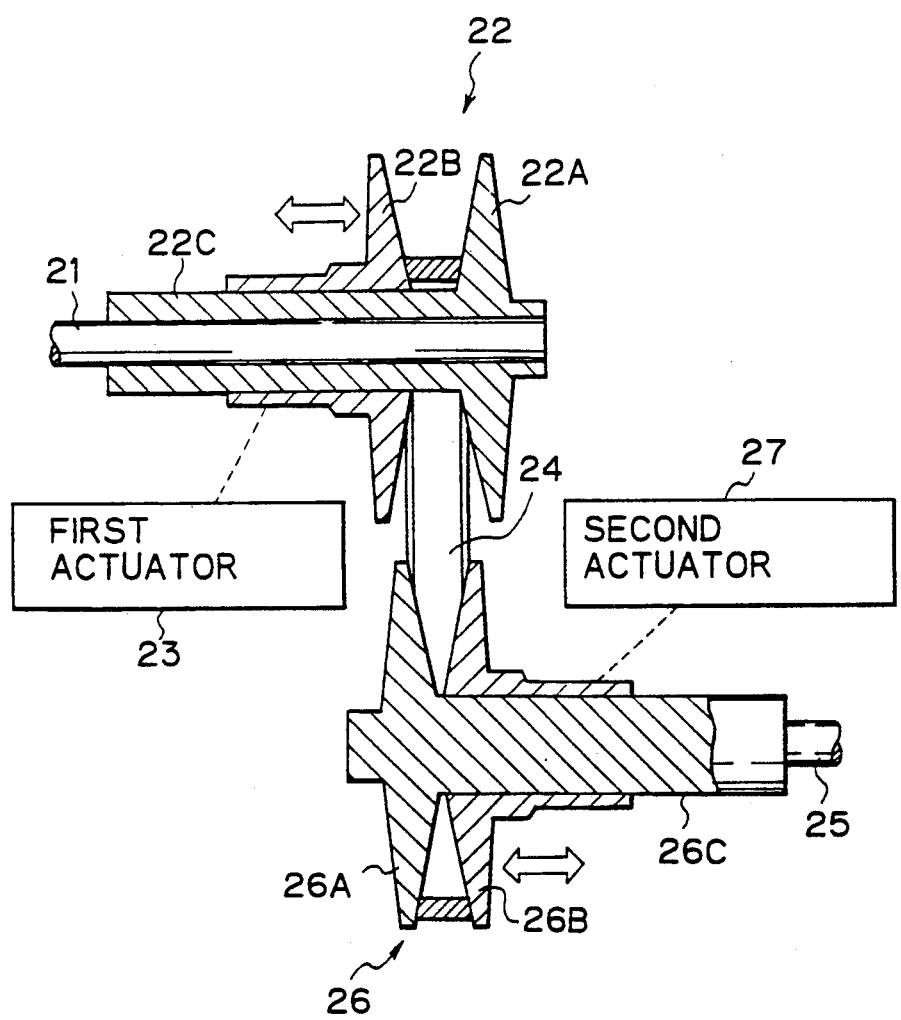
FIG. 5 is a cross section showing one example of the continuously variable transmission of FIG. 4.

FIG. 5 is a cross sectional view of one example of the continuously variable transmission CVT employed in the power train for the preferred embodiment of the two-shaft type gas turbine engine of FIG. 4. The continuously variable transmission CVT comprises an input pulley 22 provided on an input shaft 21 and having a stationary flange 22A and a movable flange 22B, an output pulley provided on an output shaft 25 and having a stationary flange 26A and a movable flange 26B, and a V-shaped belt 24 extending between the input pulley 22 and the output pulley 26. The movable flange 22B is axially movable along the line of the arrow illustrated in FIG. 5, on a sleeve section 22C, by a first actuator 23. The movable flange 26B is axially movable along the line of the arrow illustrated in FIG. 5, on a sleeve section 26C, by a second actuator 27.

The first and second actuators 23 and 27 are operable according to speed change ratio control signal icvt for the continuously variable transmission from the control circuit 10 of FIG. 4. In the condition illustrated in FIG. 5, since the effective diameter of the input pulley 22 is small and the effective diameter of the output pulley is large, the rotation speed at the input shaft 21 is reduced when transferred to the output shaft 25. From this position, when the movable flange 22B is shifted toward the stationary flange 22A by the first actuator 23 and the movable flange 26B is shifted away from the stationary flange 26A by the second actuator 27, the effective diameter of the input pulley 22 is increased and the effective diameter of the output pulley 26 is reduced, and as a result, the rotation speed at the output shaft 25 is increased.

In the two-shaft type gas turbine engine, the rotation speed N3i of the output shaft of the engine during an engine idling condition is normally set at about 800 r.p.m., to prevent a lowering of the fuel economy due to a power loss at the torque converter T/C when the vehicle is at a standstill. Here, the output PSpt of the power turbine can be expressed by:

$$PSpt = J \cdot Cp \cdot T5 \cdot G5 \cdot \eta 56 \cdot \left(1 - \frac{1}{(P5/P6)^{\frac{K-1}{K}}}\right)$$

wherein
Cp: specific heat at constant pressure;
Cv: specific heat at constant pressure;
K: specific heat ratio (=Cp/Cv);
J: thermal equivalent of work;
T5: inlet temperature of power turbine;
G5: inlet gas flow rate of power turbine;
η56: efficiency of power turbine;
P5(P6): pressure at inlet (outlet) of power turbine Assuming that the reduction ratio of the reduction gear R/G is 10, the idling speed N2i of the power turbine PT can be expressed as:

N2i = 800 × 10 = 8000 r.p.m.

Figure 6:
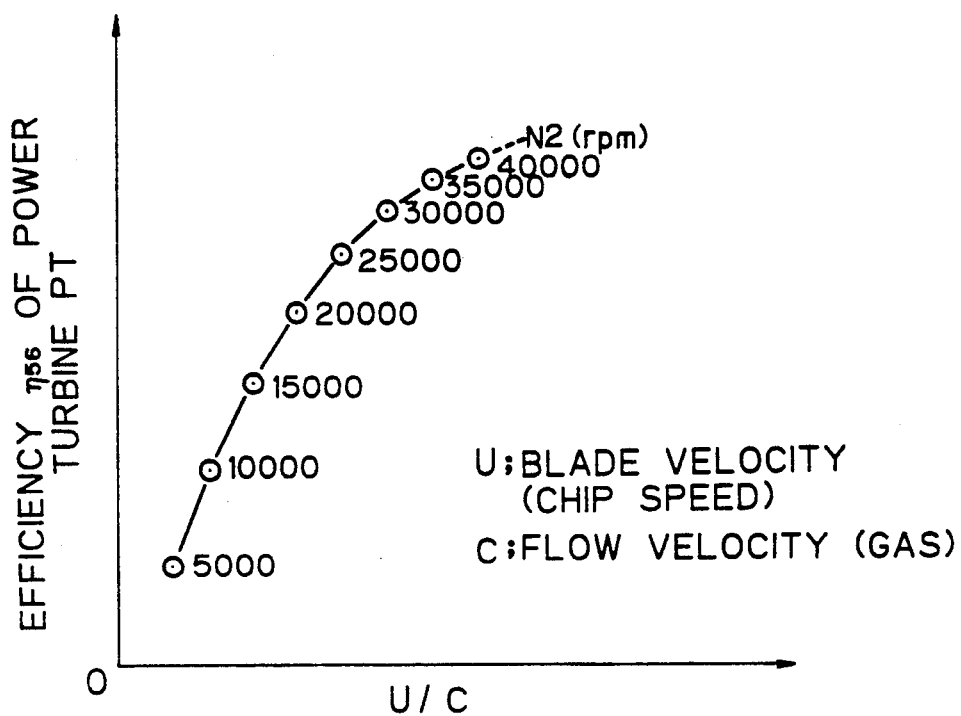
FIG. 6 is a characteristic diagram showing the efficiency of a power turbine.

On the other hand, the efficiency η56 of the power turbine PT can be illustrated as seen in FIG. 6. From the foregoing equation and the characteristics shown in FIG. 6, it can be seen that the output PSpt of the power turbine PT is increased according to an increase of the efficiency η56 of the power turbine P/T resulting from an increase of the idling speed N2i. As can be appreciated, a higher output PSpt at the power turbine improves the response characteristics upon an acceleration from a standstill.

Further, if the idling speed N3i of the input shaft of the automatic power transmission A/T is increased, to obtain a higher idling speed N2i at the power turbine PT, the power loss at the torque converter T/C is increased to thus worsen the fuel consumption. Therefore, in order to increase the idling speed N2i of the power turbine, it becomes necessary to increase the reduction ratio of the reduction gear R/G. Nevertheless, when the reduction ratio of the reduction gear R/G is increased, the operational range of the power turbine PT can be narrowed to require an increased number of shift stages of the transmission speed ratio for the automatic power transmission A/T. This problem is clearly shown in the following table:

|  | R/G | N3i | N2i | N2r | N3r |
| --- | --- | --- | --- | --- | --- |
| Prior Art | 10 | 800 | 8000 | 53000 | 5300 |
| R/G ratio up | 20 | 800 | 16000 | 53000 | 5300 | wherein N2r and N3r are rated rotation speeds.

As can be seen from the table, the operational range of the rotation speed N3 of the input shaft of the automatic power transmission A/T is limited to a range of 800 to 2650 r.p.m. when the reduction ratio of the reduction gear R/G is set at 20. Therefore, the operational range of the power turbine PT becomes substantially smaller than that of the rotation speed N3 of the input shaft of the conventional automatic power transmission A/T in a range of 800 to 5300 r.p.m., and this causes a difficulty in the selection of the transmission speed ratios when designing the automatic power transmission A/T.

Figure 7:
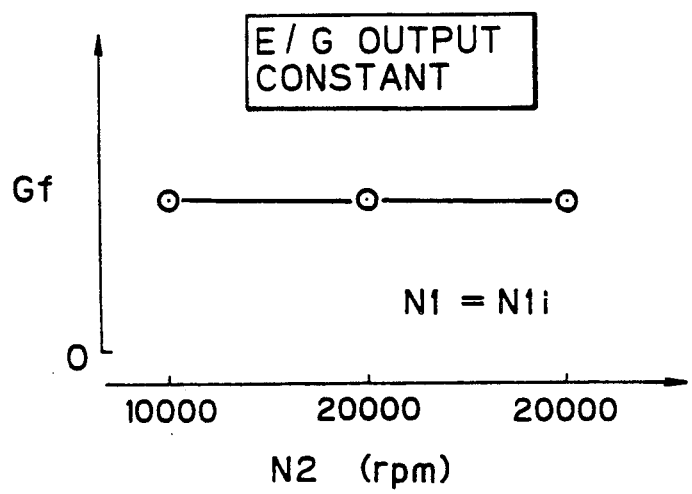
FIG. 7 is a chart showing the relationship between a rotation speed of the power turbine PT and the fuel flow rate.

FIG. 7 shows the relationship between the revolution speed N2 of the power turbine PT and the fuel flow rate Gf when the rotation speed of the gas generator GG is in an idling state, the output of the engine is constant (the output is equivalent to sum of the power consumed by power loss at the torque converter T/C while the rotation speed N3 at the input shaft of the automatic power transmission A/T is at the idling speed, and the auxiliary drive power, i.e., on a order of several horse power). From FIG. 7, it can be appreciated that, even when the revolution speed N2 of the power turbine PT is increased, the fuel flow rate Gf can be maintained at constant value as long as the engine output is maintained at a constant value.

In the embodiment illustrated in FIGS. 4 and 5, the revolution speed N2i of the power turbine PT during an idling state is controlled by utilizing the continuously variable transmission CVT in the vehicle having the two-shaft type gas turbine engine GT as a prime mover. The practical process of such a control will be discussed with reference to FIGS. 8A through 8E.

In FIGS. 8A through 8E, during a period of t<0 the engine is maintained in an idling condition, and during this period, the vehicle is at a standstill. In this embodiment, it is assumed that the rotation speed N3i of the input shaft of the automatic power transmission A/T during the engine idling condition is 800 r.p.m. Also, the speed change ratio icvt of the continuously variable transmission CVT is set at icvt =2.6 during the idling condition. The reduction ratio of the reduction gear R/G is set at 10 as in the conventional case. Furthermore, in this embodiment, the revolution speed Nli of the gas generator GG is maintained at the same speed as that of the conventional two-shaft type gas turbine engine. Under the conditions set forth above, the revolution speed N2i' of the power turbine PT during idling condition can be expressed by:

$$N2i' = 800 \times 2.6 \times 10 = 20,800 \text{ (r.p.m.)}$$

Figure 8A:
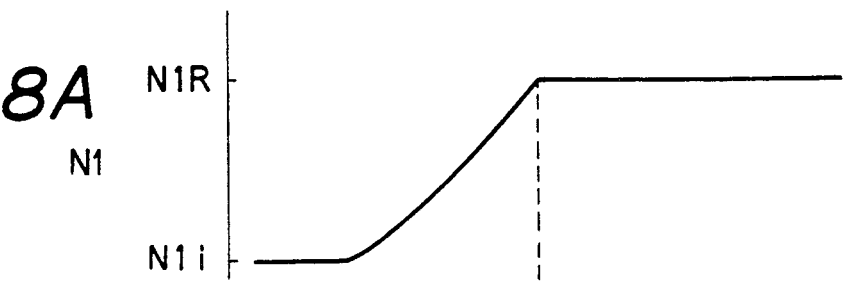
FIGS. 8A through 8E are timing charts showing variations of sensor outputs and control outputs produced by respective components of the system of FIG. 4, which illustrate one embodiment of the control of the two-shaft type gas turbine engine.
Figure 8B:
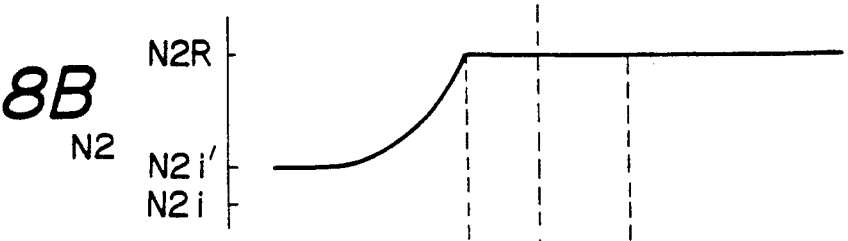

(see FIG. 8B)

Figure 1:
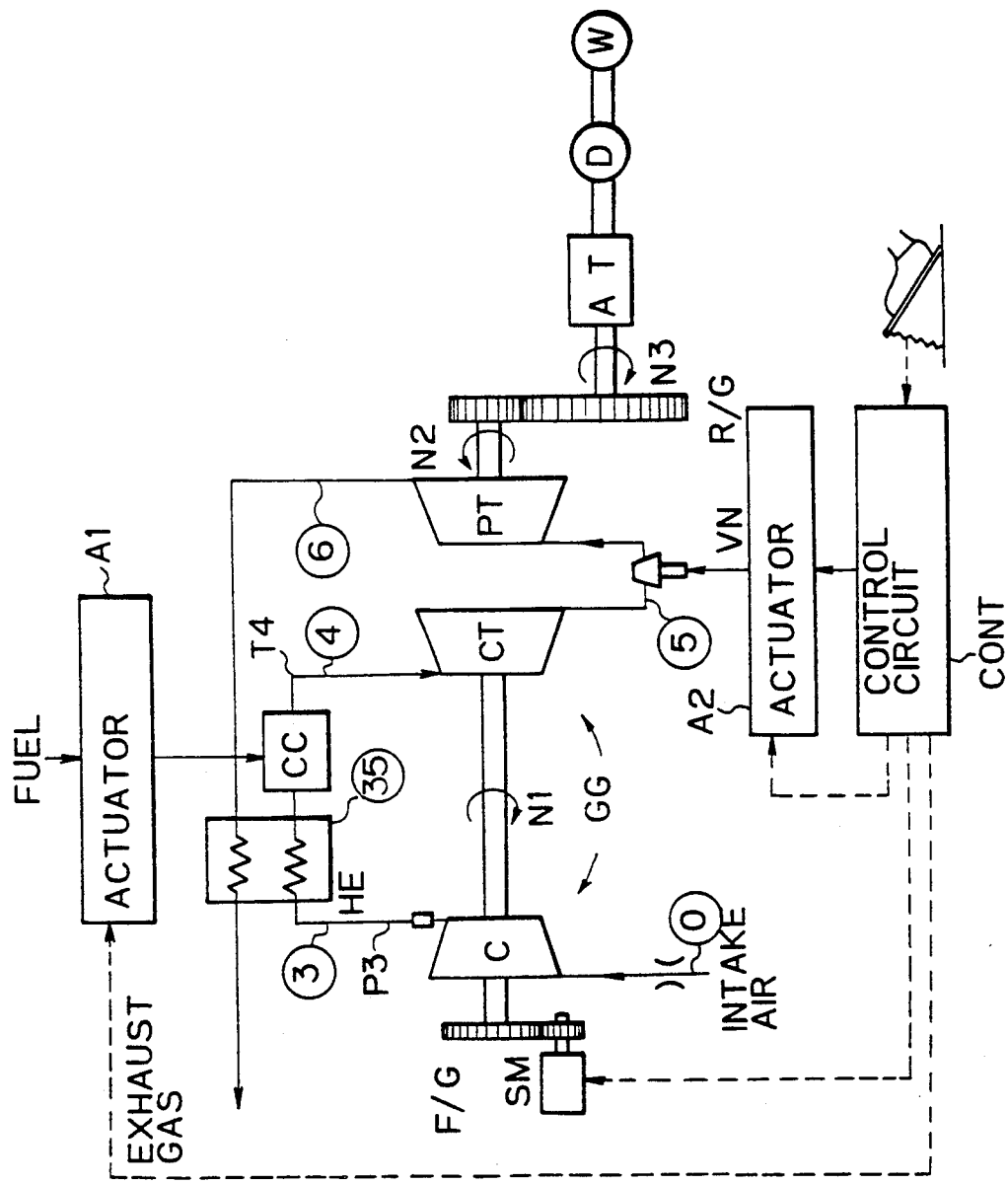
FIG. 1 is a diagram showing a conventional two-shaft type gas turbine engine associated with an automatic power transmission.
Figure 2:
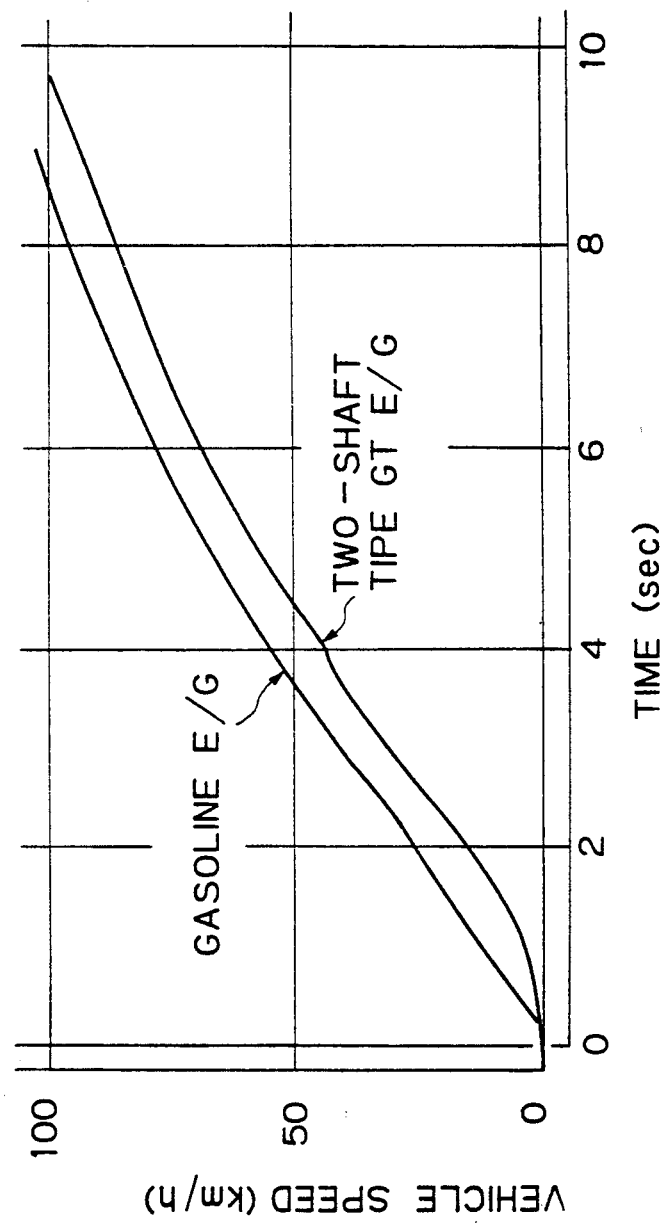
FIG. 2 is a chart showing a comparison of the acceleration characteristics of the two-shaft type gas turbine engine and a reciprocating gasoline engine.
Figure 3:
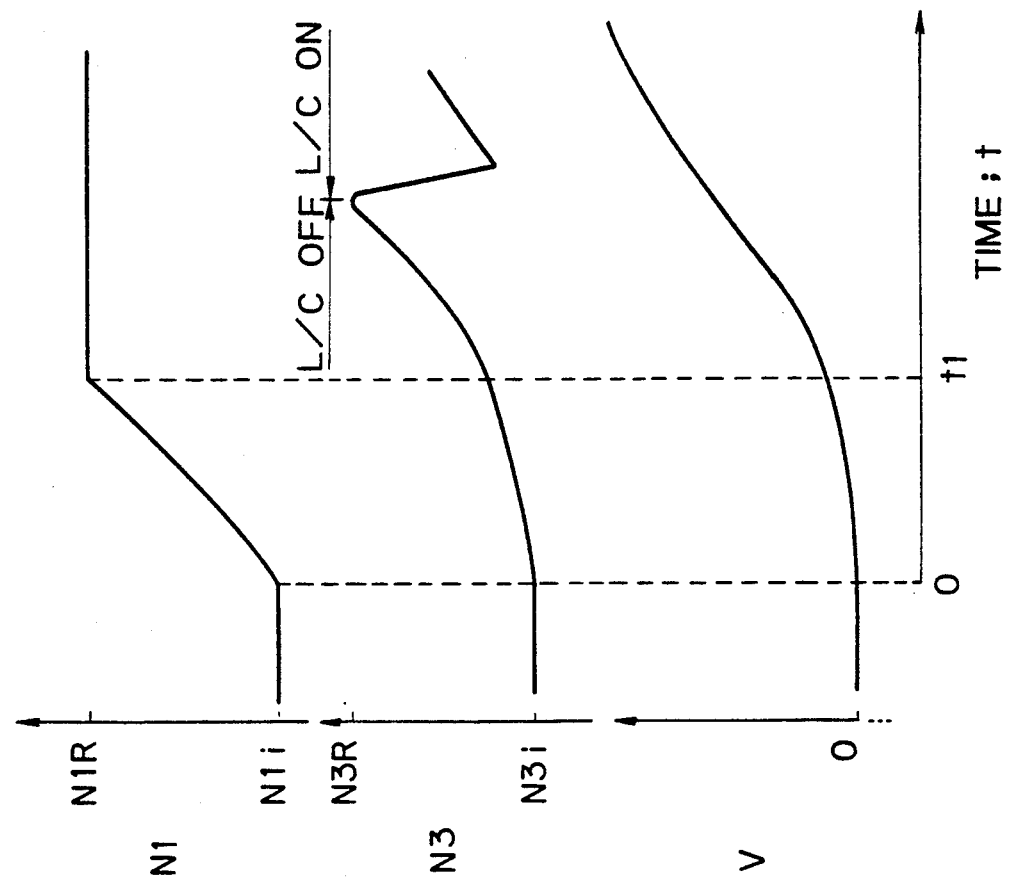
FIGS. 3A to 3C are characteristic diagrams showing the control characteristics of the two-shaft type gas turbine engine of FIG. 1.

In the conventional two-shaft type gas turbine engine of FIG. 1, the revolution speed N2i of the power turbine PT during the idling condition is 8000 r.p.m., and from a comparison therewith, it can be seen that the efficiency η56 of the power turbine PT in the shown embodiment is much higher than that of the prior art, as can be seen in FIG. 6.

Figure 8C:
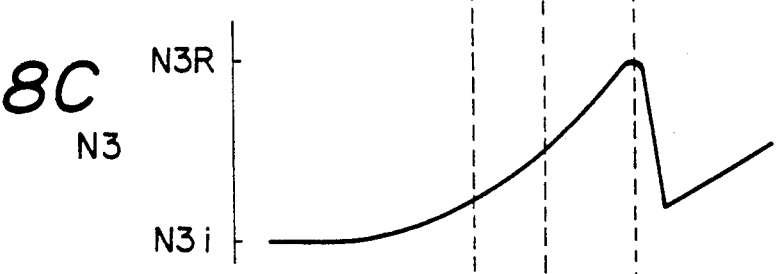
Figure 8D:
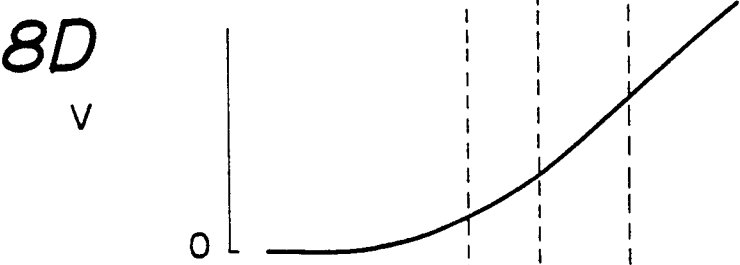
Figure 8E:
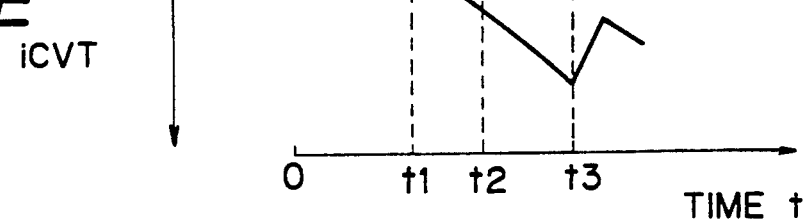

Here it is assumed that, at a time t=0, the accelerator pedal is fully depressed for a full acceleration of the vehicle, and in response, the revolution speed Nl of the compressor turbine CT increases gradually as shown in FIG. 8A. At the same time, the revolution speed N2 also increases gradually, as shown in FIG. 8B. According to the increase of the revolution speed N2 of the power turbine PT, the input speed N3 for the automatic power transmission A/T is increased as shown in FIG. 8C, and as a result, the vehicle is accelerated as shown in FIG. 8D. At a time t1, the revolution speed N2 of the power turbine PT reaches the rated revolution speed N2r, and in response, at a period t<t1, the speed change ratio icvt of the continuously variable transmission CVT is adjusted so that the revolution speed N2 of the power turbine PT is maintained at a speed equal to the rated revolution speed N2r, as shown in FIG. 8E. By controlling the speed change ratio icvt of the continuously variable transmission CVT, the rotation speed N3 at the input shaft of the automatic power transmission A/T is further increased while the revolution speed N2 of the power turbine PT is substantially maintained at the rated revolution speed Nr2. Subsequently, the revolution speed Nl of the compressor turbine CT reaches the rated revolution speed N1r at a time t=t2.

In the shown timing chart of FIGS. 8A through 8E, the variation of the input speed N3 for the automatic power transmission A/T and the speed change ratio icvt of the continuously variable transmission CVT can be observed at a time t =t3, this variation results from a shift operation by the automatic power transmission A/T. Such, variations are not concerned in the subject matter of the present invention, and thus a detailed discussion is omitted to simplify the disclosure for a better understanding of the principle of the invention.

As set forth above, upon an acceleration from standstill of the vehicle, the revolution speed N2 of the power turbine PT ie accelerated to the rated revolution speed N2r in a range of 20,800 r.p.m. to 53,000 r.p.m. which variation range is much narrower than that of the prior art, e.g., in a range of 8000 r.p.m. to 53,000 r.p.m., and is shifted to the higher revolution speed range. As set forth above, the efficiency η56 of the power turbine PT is high at a high revolution speed range, and thus this process allows the use of a revolution speed range of the power turbine PT which provides a higher efficiency η56 in comparison with that in the prior art, and as a result, the output PSpt of the power turbine PT is increased and a better response characteristic is obtained upon an acceleration of the vehicle. It is believed that the acceleration characteristics of the gas turbine engine vehicle employing the present invention, exhibits better acceleration response characteristics than that of the reciprocating gasoline engine.

It should be clearly appreciated that, although this embodiment maintains the revolution speed N2 of the power turbine PT at high revolution speed range, i.e. 20,800 r.p.m. during an engine idling condition, since the rotation speed N3 at the output shaft of the continuously variable transmission CVT is maintained at 800 r.p.m., the power loss at the torque converter T/C and the auxiliary driving power will not be changed. Therefore, as can be seen from FIG. 7, the embodiment of the two-shaft type gas turbine engine according to the present invention will not have an adverse affect on the fuel consumption, in comparison with that of the conventional two-shaft type gas turbine engine.

Figure 9A:
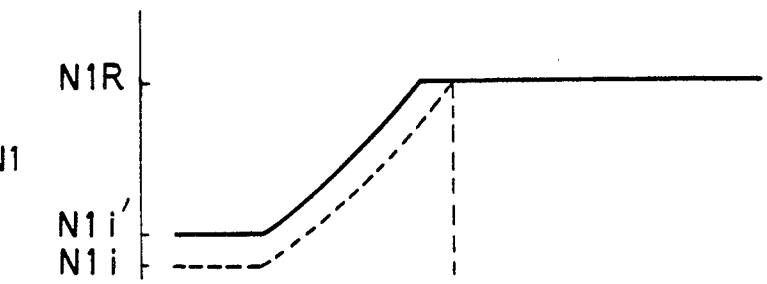
FIGS. 9A through 9E are timing charts showing variations of sensor outputs and control outputs produced by respective components of the system of FIG. 4, which illustrate another embodiment of the control of the two-shaft type gas turbine engine.

Another embodiment of control to be applied for the two-shaft type gas turbine engine of FIG. 4, will be discussed with reference to FIGS. 9A through 9E. In the former control embodiment shown in FIGS. 8A through 8E, the revolution speed Nl of the gas generator GG is maintained at the predetermined idling speed N1i, which is the same speed as that in the prior art, while the engine is driven in idling condition. In contrast to this, in the shown embodiment, the revolution speed Nl of the gas generator GG during the engine idling condition is set at a higher revolution speed N1i', which is higher than that N1i of the prior art, as shown in FIG. 9A. This can be achieved by increasing the degree of opening αs of the variable nozzle VN. Namely, in the shown embodiment, by slightly increasing the degree of opening of the variable nozzle VN during the engine idling condition, part of the energy of the power turbine PT driven at the revolution speed N2 is given to the gas generator GG driven at the revolution speed Nl. This provides a further enhanced acceleration performance.

When the degree of opening of the variable nozzle VN is increased, the revolution speed N2 of the power turbine PT is slightly lowered and the revolution speed N1 of the gas generator GG is increased. At this time, however, the fuel flow rate Gf is maintained unchanged. Namely, when the same power is generated by the engine, since the required fuel flow rate is reduced by the higher efficiency of the power turbine PT achieved by the continuously variable transmission CVT, i.e., by setting the fuel flow rate Gf at a value corresponding to that in the prior art, the revolution speed N1 of the compressor turbine CT is increased in a magnitude corresponding to the extra amount of fuel in relation to the reduced amount of fuel to be required. As can be seen, according to this embodiment, during the engine idling state, the degree of opening of the variable nozzle is increased to cause a higher revolution speed N1 at the gas generator GG, and the revolution speed N2 of the power turbine PT is held at a sufficiently level.

Figure 9B:
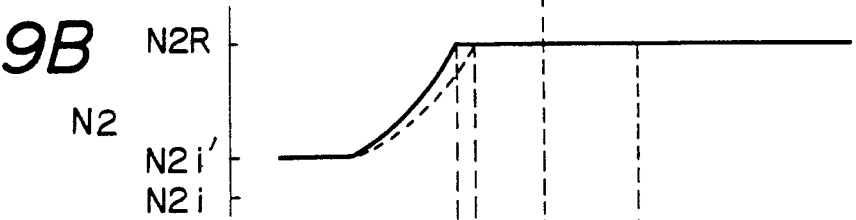
Figure 9C:
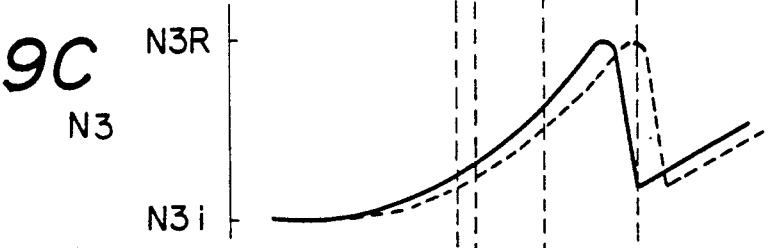
Figure 9D:
Figure 9E:
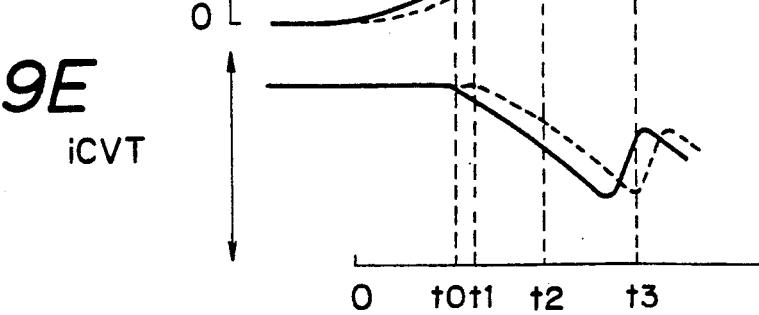

In such a control, when an acceleration is performed after a time $t=0$, the acceleration period required for accelerating the gas generator GG can be shortened in comparison with that of the former embodiment, as shown in FIG. 9A. Also, the acceleration period required for accelerating the power turbine PT to take the revolution speed N2 thereof to the rated revolution speed N2r can be shortened as shown in FIG. 9B. Therefore, the period $t0<t<t1$ needed to reach the rated revolution speed N2r of the power turbine PT can be shortened, and thus the acceleration characteristics can be further enhanced.

In the embodiment of FIG. 4, the continuously variable transmission CVT is provided between the reduction gear R/G and the automatic power transmission A/T, and this continuously variable transmission can be commonly used for the transmission and as the reduction gear. Therefore, in the modified embodiment of FIG. 10, the continuously variable transmission CVT is used to perform the functions of the reduction gear R/G and the continuously variable transmission CVT. In such a case, the continuously variable transmission CVT is provided between the output shaft of the power turbine PT and the input shaft of the automatic power transmission A/T. As can be appreciated, this embodiment of the two-shaft type gas turbine engine GT has a simplified drive train construction in comparison with the two-shaft type gas turbine engine of FIG. 4.

Figure 10:
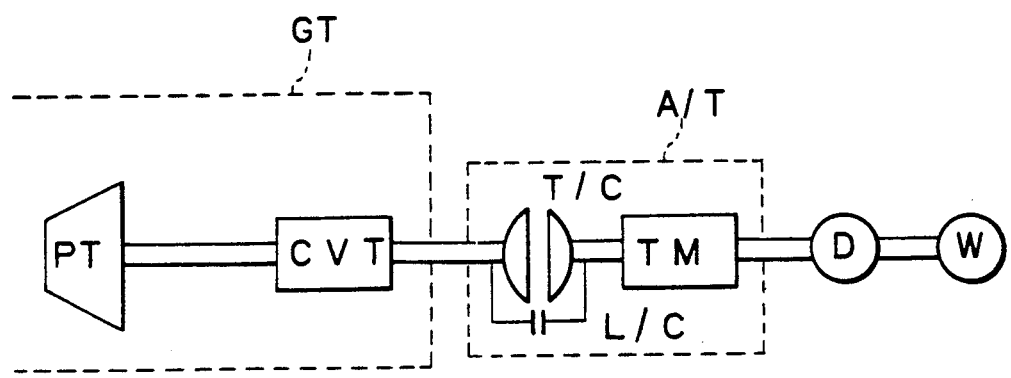
FIG. 10 is an illustration showing another manner of installation of the continuously variable transmission to the engine.

In addition, when a variation range of the speed change ratio of the continuously variable transmission is wide enough, such as between 0.5 to 6, the power transmission gear assembly TM in FIGS. 4 and 10 also can be omitted, for a further simplification of the construction. In such a case, the output shaft of the continuously variable transmission CVT will be directly connected to the differential gear unit D.

Figure 11:
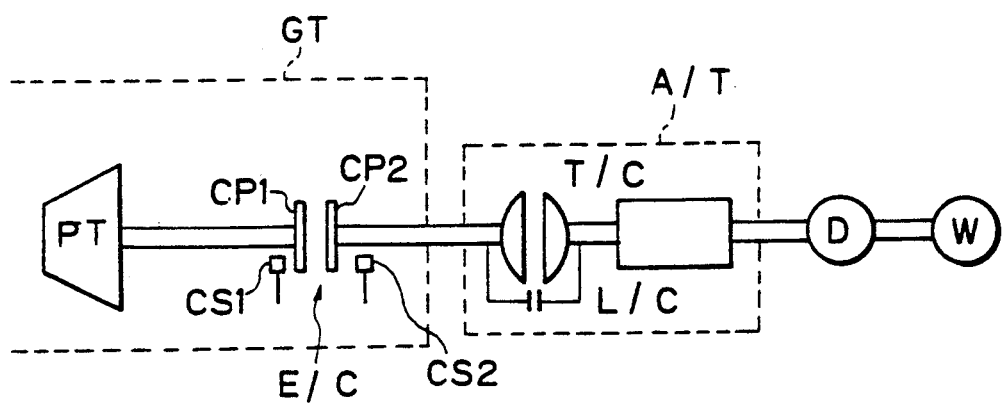
FIG. 11 is an illustration showing another embodiment of an automatic speed change mechanism to be employed in the automatic speed change system for the gas turbine engine according to the invention.

Furthermore, although the present invention has been discussed in terms of the preferred embodiment which employs the continuously variable transmission CVT as an automatic speed change mechanism for varying the reduction ratio between the output shaft of the power turbine PT and the input shaft of the automatic power transmission A/T, the automatic speed change mechanism should not be specified or limited to the continuously variable transmission CVT but can be formed of various appropriate mechanisms which allow an automatic and continuous adjustment of speed change ratios. For instance, an electronically controlled clutch E/C as shown in FIG. 11 may be employed in place of the continuously variable transmission CVT. In such a case, the rotation speeds at the input shaft and output shaft of the clutch E/C may be continuously monitored by sensors CS1 and CS2, and a slip ratio between clutch plates CP1 and CP2 may be adjusted to establish a desired speed change ratio between the input and output shafts thereof by an electrically operable actuator (not shown). The clutch E/C may either a wet type or dry type.

As set forth above, the two-shaft type gas turbine engine according to the present invention successfully improves the acceleration characteristics of the two-shaft type gas turbine vehicle to provide a satisfactorily enhanced acceleration performance for the vehicle, without causing a worsening of the fuel consumption, by adjusting the speed reduction ratio at the automatic speed change mechanism according to the vehicle driving condition.

I claim:

1. An automatic speed changing system for a two-shaft type gas turbine engine having a gas generator including a compressor and a compressor turbine arranged coaxially on a first shaft with sid copressor, a combustion chamber, a variable nozzle, and a power turbine rotatable about a turbine shaft independently of the first shaft of said compressor and said compressor turbine, said system comprising:

an automatic speed change mechanism disposed between an output shaft of said power turbine and an input shaft of a power transmission device, said automatic speed change mechanism including a reduction gear connected to said output shaft of said power tube and a continuously variable transmission connected to an output shaft of said reduction gear, a reduction ratio of said automatic speed change mechanism being variable depending upon the engine driving condition and wherein sid continuously variable transmission has an input shaft and an output shaft an input pulley provided at an input shaft side and having a variable spacing between a pair of flanges, an output pulley provided at an output shaft side and having a variable spacing between a pair of flanges, and a V-shaped belt extending over said input and output pulleys, said spacings of said pairs of flanges in said input and output pulleys being adjusted to thereby vary effective diameters of said input and output pulleys to adjust a speed change ratio when transferring a rotation from said input shaft to sid output shaft.

2. A system as set forth in claim 1, wherein said reduction ratio of said automatic speed change mechanism during an idling state is made higher than that existing during another driving state.

* * * * *

UNITED STATES PATENT AND TRADEMARK OFFICE
CERTIFICATE OF CORRECTION

PATENT NO. : 5,184,526
DATED : February 9, 1993
INVENTOR(S) : Atsushi WATANABE

It is certified that error appears in the above-identified patent and that said Letters Patent is hereby corrected as shown below:

Column 2, line 26, change "≯" to --≧--.

Column 4, lines 53 and 54, after "a" at the end of line 53 and before "input" at the beginning of line 54, insert --control circuit 10. The control circuit 10 has an analog--.

Column 8, line 9, delete the comma after "Such" and change "not concerned" to --not of concern--.

Column 8, line 15, change "ie" to --is--.

Column 8, line 42, change "affect" to --effect--.

Column 8, line 56, after "higher than that" insert --of--.

Column 9, line 16 and 17, change "sufficiently" to --sufficient--.

Column 10, line 29, change "sid" to --said--.

UNITED STATES PATENT AND TRADEMARK OFFICE
CERTIFICATE OF CORRECTION

PATENT NO. : 5,184,526

DATED : February 9, 1993

INVENTOR(S) : Atsushi WATANABE

It is certified that error appears in the above-identified patent and that said Letters Patent is hereby corrected as shown below:

Column 10, line 39, change "tube" to --turbine--.

Column 10, line 43, change "sid" to --said--.

Column 10, line 45, after "shaft" insert a comma.

Signed and Sealed this

Twenty-second Day of February, 1994

Attest:

BRUCE LEHMAN

*Attesting Officer*      *Commissioner of Patents and Trademarks*